US008397500B2

(12) United States Patent
Andrasko et al.

(10) Patent No.: US 8,397,500 B2
(45) Date of Patent: Mar. 19, 2013

(54) SYSTEM AND METHOD FOR ESTIMATING AIRFLOW RESTRICTION OF AN ENGINE AIR FILTER

(75) Inventors: Steven J. Andrasko, Wixom, MI (US); Yun Xiao, Ann Arbor, MI (US); Brent T. Deep, Fenton, MI (US)

(73) Assignee: GM Global Technology Operations LLC

( * ) Notice: Subject to any disclaimer, the term of this patent is extended or adjusted under 35 U.S.C. 154(b) by 544 days.

(21) Appl. No.: 12/704,761

(22) Filed: Feb. 12, 2010

(65) Prior Publication Data

US 2011/0197580 A1 Aug. 18, 2011

(51) Int. Cl.
*F02B 33/44* (2006.01)
*G01M 15/00* (2006.01)
*G01F 1/68* (2006.01)

(52) U.S. Cl. .................. 60/605.1; 73/114.31; 73/114.34

(58) Field of Classification Search .. 73/114.31–114.34; 123/198 E; 60/598, 602, 603, 605.1
See application file for complete search history.

(56) References Cited

U.S. PATENT DOCUMENTS 5,698,780 A * 12/1997 Mizutani et al. ........... 73/114.33
6,192,867 B1 * 2/2001 Fenchel et al. ................ 123/486
2004/0178895 A1 * 9/2004 Pontius ......................... 340/439
2010/0119901 A1 * 5/2010 Yumiya ........................... 429/24

FOREIGN PATENT DOCUMENTS

WO WO 2008126668 A1 * 10/2008

* cited by examiner

*Primary Examiner* — Kenneth Bomberg
*Assistant Examiner* — Audrey K Bradley

(57) ABSTRACT

A control system for an engine that includes a turbocharger includes a restriction estimation module and an engine protection module. The restriction estimation module estimates restriction of airflow through an air filter of the engine based on a comparison between measured and modeled temperatures at an outlet of a compressor of the turbocharger. The engine protection module, based on the estimated airflow restriction, at least one of controls turbocharger boost, controls turbocharger airflow, controls a fueling rate of the engine, and generates a warning signal for a driver of a vehicle.

19 Claims, 3 Drawing Sheets

SYSTEM AND METHOD FOR ESTIMATING AIRFLOW RESTRICTION OF AN ENGINE AIR FILTER

FIELD

The present disclosure relates to internal combustion engines, and more particularly to a system and method for estimating airflow restriction of an engine air filter.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel mixture within cylinders to generate drive torque. The air may be drawn into an inlet of a compressor (of a turbocharger) and through an air inlet system that may be regulated by a throttle. The air may be filtered by an air filter located upstream from (i.e., before) the compressor. The filtered air may then be distributed to a plurality of cylinders and combined with fuel to create the A/F mixture. The air may be combined with fuel prior to entering the cylinders (i.e., port fuel injection) or the air may be combined with the fuel within the cylinders (i.e., direct fuel injection). The A/F mixture may then be compressed by pistons and ignited. The ignition of the A/F mixture may be via a spark generated by a spark plug (i.e., spark ignition) and/or the ignition of the A/F mixture may be "automatic" due to increased temperature and/or pressure of the A/F mixture (i.e., compression ignition).

The ignition of the A/F mixture drives the pistons, which rotatably turn a crankshaft generating drive torque. The drive torque may be transferred to a driveline (e.g., wheels) of a vehicle via a transmission that includes a plurality of gear ratios. Exhaust gas resulting from combustion may be expelled from the cylinders through an exhaust manifold and an exhaust treatment system. The exhaust gas may also be recirculated into the intake manifold via an exhaust gas recirculation (EGR) system and/or recirculated to power a turbocharger that further pressurizes the air drawn into the intake manifold.

SUMMARY

A control system for an engine that includes a turbocharger includes a restriction estimation module and an engine protection module. The restriction estimation module estimates restriction of airflow through an air filter of the engine based on a comparison between measured and modeled temperatures at an outlet of a compressor of the turbocharger. The engine protection module, based on the estimated airflow restriction, at least one of controls turbocharger boost, controls turbocharger airflow, controls a fueling rate of the engine, and generates a warning signal for a driver of a vehicle.

A method for an engine that includes a turbocharger includes estimating restriction of airflow through an air filter of the engine based on a comparison between measured and modeled temperatures at an outlet of a compressor of the turbocharger, and, based on the estimated airflow restriction, at least one of controlling turbocharger boost, controlling turbocharger airflow, controlling a fueling rate of the engine, and generating a warning signal for a driver of a vehicle.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
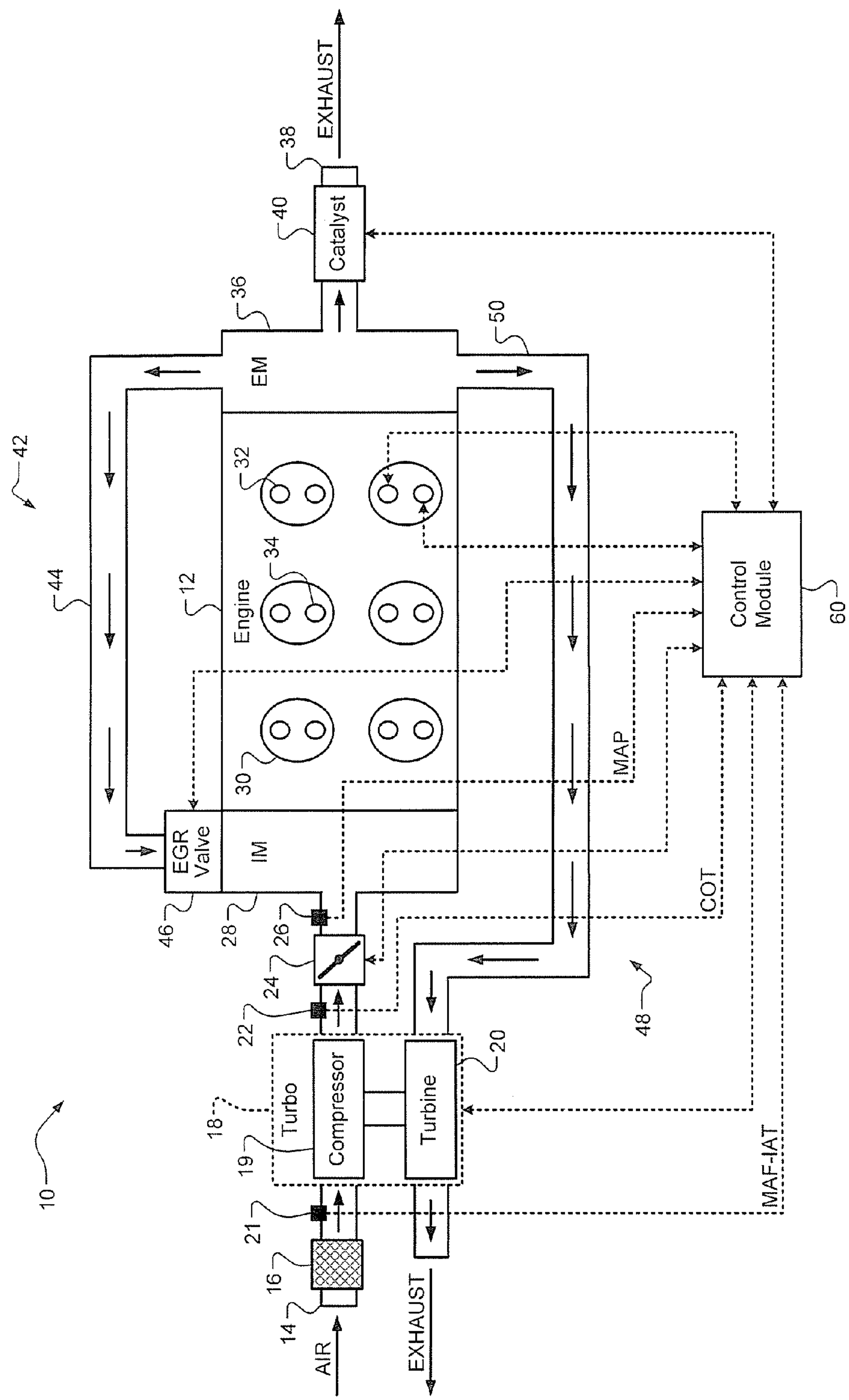
FIG. 1 is a functional block diagram of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Internal combustion engines may draw air into an intake manifold through an inlet of a compressor (of a turbocharger) and through an air inlet system that may be regulated by a throttle. The air may be filtered by an air filter located upstream from (i.e., before) the compressor. The turbocharger may be located upstream from the throttle and may further pressurize the air drawn into the intake manifold. The filtered and pressurized air may then be distributed to a plurality of cylinders and combined with fuel to create the A/F mixture.

Airflow capability through the air filter may decrease over time due to accumulation in the air filter. For example, airflow capability through the air filter may decrease due accumulated particulates (e.g., dust) or due to snow and/or water ingested by the inlet. Additionally or alternatively, airflow capability through the air filter may decrease due to operation of an engine cooling fan. The decreased airflow capability through the air filter may be referred to as "airflow restriction."

When the airflow restriction exceeds a predetermined level, the driver may require a warning and/or the air filter may require replacement. Moreover, the excessive airflow restriction may result in damaging operating conditions for the turbocharger. For example, the turbocharger may operate at above a maximum speed threshold ("an over-speed condition") in order to generate a desired amount of engine torque. Additionally or alternatively, the engagement of the engine cooling fan may result in a compressor inlet pressure drop (e.g., about 1 kPa), which may result damaging operating conditions. The damaging operating conditions may result in damage to the turbocharger.

Pressure sensors may be implemented after the air filter to determine a pressure drop corresponding to the airflow restriction. Pressure sensors, however, may be difficult and/or costly to implement. Similarly, a turbocharger speed sensor may be implemented but may also be difficult and/or costly to implement. Alternatively, engine power output may be limited to an amount less than the maximum power output of the engine (e.g., 20 to 30 horsepower less) at all engine operating conditions. In other words, limiting the engine output power may protect the turbocharger from damaging operating conditions. Limiting the engine output power at all engine operating conditions, however, may severely decrease performance.

Therefore, a system and method is presented that estimates airflow restriction of an air filter based on a comparison between a modeled temperature at an outlet of a compressor (of a turbocharger) and a measured temperature at the outlet of the compressor. More specifically, the modeled temperature may be based on a measured temperature at an inlet of the compressor and a pressure at the outlet of the compressor. In other words, the modeled temperature may be based on temperatures and pressures from existing engine sensors. For example, the compressor outlet temperature (COT) may be measured using an intake air temperature (IAT) sensor and the outlet pressure may be measured using an intake manifold absolute pressure (MAP) sensor. Alternatively, however, other temperature and/or pressure sensors may be used.

The system and method may then estimate the airflow restriction based on the comparison between the modeled and measured outlet temperatures. More specifically, a difference between the modeled and measured outlet temperatures may correspond to a difference in actual and expected pressures after the air filter (i.e., before the compressor). In other words, the airflow restriction of the air filter may be inferred based on the difference between the modeled and measured temperatures.

The system and method may then perform various operations to protect the engine from problems associated with airflow restriction. More specifically, the system and method may decrease a maximum boost of the turbocharger when the airflow restriction is greater than a first predetermined threshold. Additionally, the system and method may decrease a maximum fuel rate of the engine when the airflow restriction is greater than a second predetermined threshold. For example, the second predetermined threshold may be greater than the first predetermined threshold.

The system and method may also determine whether an error condition is present. More specifically, the error condition may be based on a gradual accumulation of particulates in the air filter (i.e., a dirty air filter). For example, the error condition may be detected when the airflow restriction is greater than a predetermined restriction threshold. Additionally or alternatively, the error condition may be detected based on a presence of water and/or snow in the intake manifold. For example, the error condition may be detected when a rate of change of the airflow restriction is greater than a predetermined rate of change threshold and when the IAT is less than a predetermined temperature threshold. For example only, the predetermined temperature threshold may be 0° C. When an error condition is detected, the system and method may warn the driver of the vehicle. For example, the warning may be visual (i.e., a light) and/or audible.

Referring now to FIG. 1, an engine system 10 includes an engine 12. For example, the engine 12 may include a spark ignition (SI) engine or a compression ignition (CI) engine, such as a diesel engine or a homogeneous charge compression ignition (HCCI) engine.

The engine 12 draws in air through an inlet 14 that includes an air filter 16, a compressor 19, and a throttle 24. The air filter 16 may be located upstream from (i.e., before) the compressor 19 and may filter particulates from the air. The compressor 19 (part of a turbocharger 18) may further pressurize the air drawn in through the inlet 14. The throttle 24 may regulate a rate of air flowing into an intake manifold 28 of the engine 12. For example only, the throttle 24 may be controlled electronically (e.g., electronic throttle control, or ETC).

A mass air flow (MAF) sensor 21 measures the MAF rate into the intake manifold 28. For example, the MAF sensor 21 may also measure IAT upstream from the compressor 19. Additionally, a COT sensor 22 measures temperature of the pressurized air at an outlet of the compressor 19. The intake manifold 28 may also include a plurality of pressure and/or temperature sensors. More specifically, an intake manifold absolute pressure (MAP) sensor 26 measures pressure of the air inside the intake manifold 28.

The air in the intake manifold 28 may be distributed to a plurality of cylinders 30. While six cylinders are shown, the engine 12 may include other numbers of cylinders. The air distributed to the cylinders 30 may be combined with fuel to create an air/fuel (A/F) mixture. As shown, fuel injectors 32 located in each of the cylinders 30 may directly inject fuel into the cylinders (i.e., direct fuel injection). The fuel injectors 32, however, may also be implemented to inject fuel via intake ports of the cylinders 30 (i.e., port fuel injection).

The A/F mixture in the cylinders 30 may be compressed by pistons (not shown) and combusted using spark from spark plugs 34 (e.g., an SI engine, or an HCCI engine operating in SI combustion mode). The A/F mixture, however, may also be automatically ignited by compressing the A/F mixture using the pistons (not shown) and increasing the pressure and/or temperature of the A/F mixture above a critical threshold (e.g., a compression ignition engine, such as a diesel engine, or an HCCI engine operating in HCCI combustion mode). Alternatively, the A/F mixture may be automatically ignited with spark assist from the spark plugs 34 (e.g., an HCCI engine operating in mixed mode combustion). The ignition of the A/F mixture in the cylinders 30 drives the pistons (not shown), which rotatably turn a crankshaft (not shown) to generate drive torque. The drive torque may be transferred to a driveline of a vehicle (e.g., wheels) via a transmission (not shown) that includes a plurality of gears.

Exhaust gas resulting from the combustion of the A/F mixture within the cylinders 30 may be expelled from the cylinders 30 into an exhaust manifold 36. The exhaust gas in the exhaust manifold may be expelled from the engine 12 through an exhaust treatment system 38. The exhaust treatment system 38 may further include a catalyst 40, such as a catalytic converter. The exhaust treatment system 38, however, may also include other exhaust treatment components such as, but not limited to, oxidation catalysts (OCs), particulate matter filters (PMFs), selective catalytic reduction (SCR) systems, nitrogen oxide (NOx) absorbers/adsorbers, lean NOx traps (LNTs), etc.

The exhaust gas in the exhaust manifold 36 may be circulated through an external exhaust gas recirculation (EGR) system 42. The external EGR system 42 may include an EGR line 44 and an EGR valve 46. The EGR line 44 may connect the exhaust manifold 36 to the intake manifold 28. The EGR valve 46 may control an amount of exhaust gas that is allowed to enter the intake manifold 28 from the exhaust manifold 36 via the EGR line 44.

The exhaust gas in the exhaust manifold 36 may also be directed through a turbine 20 of the turbocharger 18 via an exhaust system 48. The exhaust system 48 may include one or more exhaust ducts 50 and the turbine 20. The one or more exhaust ducts 50 may connect the exhaust manifold 36 to the turbine 20. The turbine 20 may be driven by the exhaust gas to generate shaft torque that powers the compressor 19 to further pressurize air supplied to the intake manifold 28, resulting in more airflow to the cylinders 30. The increased airflow to the cylinders 30 may allow for increased fuel injection, and the combustion may generate more drive torque.

A control module 60 controls operation of the engine system 10 and may implement the system and/or method of the present disclosure. The control module 60 may control the throttle 24, the fuel injectors 32, and the spark plugs 34 to regulate airflow, fuel injection quantity and/or timing, and spark timing, respectively. The control module 60 may control the exhaust treatment system 38 (and corresponding components) and/or the catalyst 40 to regulate (e.g., minimize) emissions produced by the engine 12. The control module 60 may control the EGR valve 46 to regulate an amount of exhaust gas introduced into the intake manifold 28. Furthermore, the control module 60 may control a pressure of the exhaust gas received by the turbocharger 18 (e.g., via a wastegate), an amount of boost (i.e., pressure difference) of the turbocharger 18 (e.g., via an electronic boost controller), and/or an airflow of the turbocharger 18 (e.g., via an electronic airflow controller).

The control module 60 also receives signals indicating various engine operating parameters. More specifically, the control module 60 may receive signals from the MAF sensor 21, the COT sensor 22, and the MAP sensor 26. For example, the MAF sensor 21 may measure temperature at the inlet of the compressor 19 (in addition to MAF rate). Therefore, the MAF sensor 21 may be hereinafter referred to as the MAF-IAT sensor 21. However, another temperature sensor may be implemented to measure temperature at the inlet of the compressor 19.

The COT sensor 22 may be located at the outlet of the compressor 19 and may measure COT. The MAP sensor 26 may be located in the intake manifold 28 and may measure MAP. Additionally, the control module 60 may receive signals from the throttle 24 and the EGR valve 46 indicating airflow into the engine (i.e., MAF rate) and amount of exhaust gas entering the intake manifold 28, respectively. Furthermore, the control module 60 may receive signals indicative of engine operating parameters such as engine speed (e.g., in revolutions per minute, or RPM), cylinder pressure, exhaust pressure and/or temperature, exhaust gas NOx concentration, speed of the turbine 20, etc.

Figure 2:
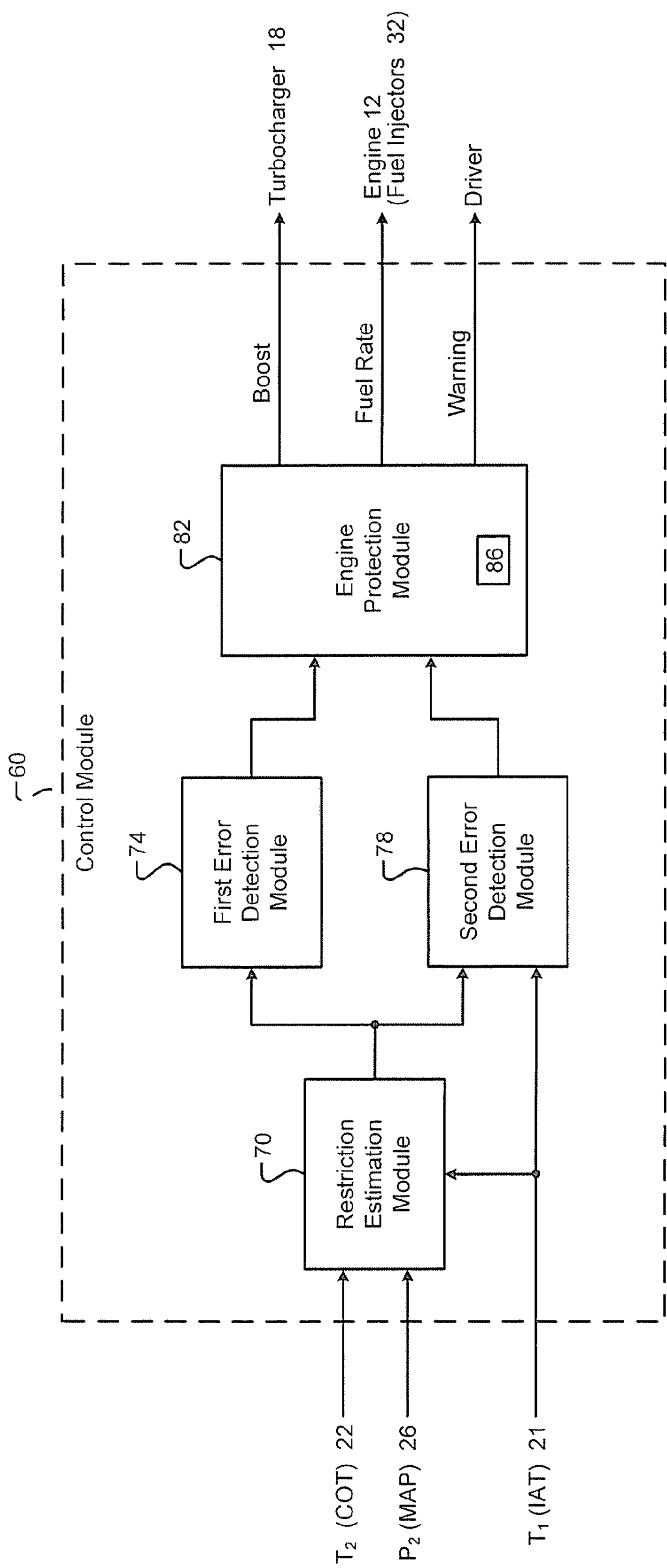
FIG. 2 is a functional block diagram of an exemplary control module according to the present disclosure.

Referring now to FIG. 2, the control module 60 is shown in more detail. The control module 60 may include a restriction estimation module 70, a first error detection module 74, a second error detection module 78, and an engine protection module 82. The engine protection module 82 may further include a barometric pressure sensor 86 that measures barometric pressure. However, the barometric pressure sensor 86 may also be located elsewhere in the control module 60 or elsewhere in the vehicle.

The restriction estimation module 70 receives signals indicating turbocharger inlet and outlet temperatures ($T_1$ and $T_2$, respectively) and turbocharger outlet pressure ($P_2$). For example, the MAF-IAT sensor 21 may measure $T_1$, the COT sensor 22 may measure $T_2$, and the MAP sensor 26 may measure $P_2$. The restriction estimation module 70 estimates airflow restriction based on a comparison between the measured outlet temperature $T_2$ and a modeled outlet temperature ($T_m$).

More specifically, the restriction estimation module 70 may model the outlet temperature $T_m$ as follows:

$$T_m = T_1\left(1 + \frac{1}{\eta_c}\left[\left(\frac{P_2}{P_1}\right)^{\frac{k-1}{k}} - 1\right]\right),$$

where $T_m$ is the modeled outlet temperature of the turbocharger 20, $T_1$ is the measured inlet temperature of the turbocharger 20, $\eta_c$ is an efficiency of the compressor 19 based on compressor flow and pressure ratio, $P_1$ is an unknown pressure at the inlet of the turbocharger 20, $P_2$ is the measured pressure at the outlet of the turbocharger 20, and k is a specific heat ratio.

The restriction estimation module 70 may estimate airflow restriction of the air filter 16 based on a comparison between the modeled outlet temperature $T_m$ and the measured outlet temperature $T_2$. More specifically, when the measured outlet temperature $T_2$ is greater than the modeled outlet temperature $T_m$, the quantity ($P_2/P_1$) may be higher than expected. The outlet pressure $P_2$, however, is a known pressure, and thus the inlet pressure $P_1$ may be less than expected (i.e., indicating airflow restriction). Therefore, for example, a magnitude of the difference between the modeled and measured outlet temperatures $T_m$ and $T_2$, respectively, may correspond to magnitude of an increase in the estimated airflow restriction.

The first error detection module 74 receives the estimated airflow restriction. The first error detection module 74 may perform long-term monitoring of the estimated airflow restriction to determine when the air filter 16 needs to be replaced due to clogging by particulates. For example, the long-term monitoring may occur during a first predetermined period. The first error detection module 74 may further include a filter that filters the estimated airflow restriction before storing the estimated airflow restriction in memory (e.g., erasable electronic programmable read-only memory, or EEPROM). In other words, the filter may heavily filter the estimated airflow restriction to prevent inaccurate estimates from being stored in memory.

The first error detection module 74 may detect that the air filter 16 needs to be replaced when the long-term monitoring indicates an estimated airflow restriction greater than a predetermined restriction threshold ($TH_R$). When the first error detection module 74 detects that the air filter needs to be replaced, the first error detection module 74 may generate a replacement signal for the engine protection module 82.

The second error detection module 78 also receives the estimated airflow restriction. The second error detection module 78 may also receive the inlet temperature $T_1$ (e.g., from the MAF-IAT sensor 21). The second error detection module 78 performs short-term monitoring of the estimated airflow restriction to determine when the air filter 16 is clogged with snow and/or ice. For example, the short-term monitoring may occur during a second predetermined period that is less than the first predetermined period. The second error detection module 78 may further include a filter that filters the estimated airflow restriction before determining whether the air filter 16 is clogged with snow and/or ice. In other words, the filter may lightly filter the estimated airflow restriction to allow for faster determinations of whether the air filter 16 is clogged with snow and/or ice.

The second error detection module 78 may detect that the air filter 16 is clogged with snow and/or ice when two conditions are detected. In other words, the two conditions indicate that the clogging is due to snow and/or ice. The first condition includes a rate of change of the estimated airflow restriction during a predetermined period being greater than a predetermined rate of change threshold ($TH_C$). In other words, the second error detection module 78 may determine that the air filter 16 was clogged quickly. The second condition includes the inlet temperature $T_1$ being less than a predetermined temperature threshold ($TH_T$). For example only, the predetermined temperature threshold $TH_T$ may be 0° C.

When the second error detection module 78 detects the first and second conditions, the second error detection module 78 may generate a restriction signal for the engine protection module 82. However, when the second error detection module 78 detects the first condition but not the second condition, the second error detection module 78 may determine that the air filter 16 needs to be replaced (i.e., clogging not due to snow and/or ice). Thus, either the first error detection module 74 or the second error detection module 78 would generate the replacement signal for the engine protection module 82.

The engine protection module 82 may receive the replacement signal or the restriction signal. The engine protection module 82 may perform various actions by controlling engine components to prevent damage to the engine 12 and/or to engine components based on the replacement or restriction signals. The engine protection module 82 may also generate warning signals for the driver requesting maintenance that may prevent damage to the engine 12 based on the replacement or restriction signals.

First, the engine protection module 82 may control boost of the turbocharger 18 (either directly or via a boost controller). More specifically, the engine protection module 82 may decrease the boost of the turbocharger 18. Additionally or alternatively, however, the engine protection module 82 may decrease a both the boost of and airflow of the turbocharger 18 (either directly or via a boost controller and an airflow controller, respectively). For example, the boost of and airflow of the turbocharger may vary based on engine speed and altitude of the vehicle.

Second, the engine protection module 82 may control a fuel rate of the engine 12 by controlling the fuel injectors 32. More specifically, the engine protection module 82 may decrease a maximum fuel rate of the engine 12. For example, the maximum fuel rate may vary based on engine speed and altitude of the vehicle. Additionally or alternatively, however, the engine protection module 82 may severely limit the fuel rate to command a limp-home mode of the engine 12 (at least temporarily) when the airflow restriction is greater than a threshold. In other words, decreasing or limiting the fuel rate while decreasing boost and airflow may prevent the turbocharger 18 from damaging operation conditions.

Lastly, the engine protection module 82 may generate warning signals for the driver requesting maintenance that may prevent damage to the engine 12. More specifically, the warning signals may actuate visual and/or audible devices. For example, the warning signals may actuate a light such as a malfunction indicator lamp (MIL).

Thus, when the replacement signal is received, the engine protection module 82 may generate a warning signal requesting replacement of the air filter 16. Additionally or alternatively, the engine protection module 82 may decrease boost/maximum boost, decrease/disable fuel, etc., depending on the severity of the airflow restriction. For example, the four actions may accordingly range from least severe airflow restriction to most severe airflow restriction: decrease boost (least severe), decrease both boost and airflow, decrease maximum fuel rate, and limiting fuel rate to command the limp-home mode (most severe).

Thus, when the restriction signal is received, the engine protection module 82 may generate a warning signal to notify the driver that the engine 12 has ingested snow and/or ice. For example, the driver may then stop the vehicle to prevent damage to the engine 12. Additionally or alternatively, the engine protection module 82 may perform one of more of the four actions (described above), depending on the severity of the clogging due to snow and/or ice. For example, airflow restriction due to snow and/or ice may be more severe than airflow restriction due to a dirty air filter, and accordingly may require more severe responsive actions to prevent damage to the engine 12 and/or engine components.

Alternatively, the engine protection module 82 may adjust the barometric pressure sensor 86 to compensate for the airflow restriction. In other words, the engine protection module 82 may command a predetermined offset to the barometric pressure sensor 86. For example only, the predetermined offset may be a few hundred feet in altitude. The control module 60 may then compensate for the change in barometric pressure, effectively compensating for the airflow restriction. Lastly, the engine protection module 82 may also limit a power capacity of the engine 12 to a predetermined capacity. For example only, the predetermined capacity may be 80%. By limiting the power capacity of the engine 12, the engine protection module 82 may protect the turbocharger 18 from damaging operating conditions. For example, the engine protection module 82 may limit the power capacity of the engine 12 by controlling at least one of air, fuel, and spark supplied to the engine 12.

Figure 3:
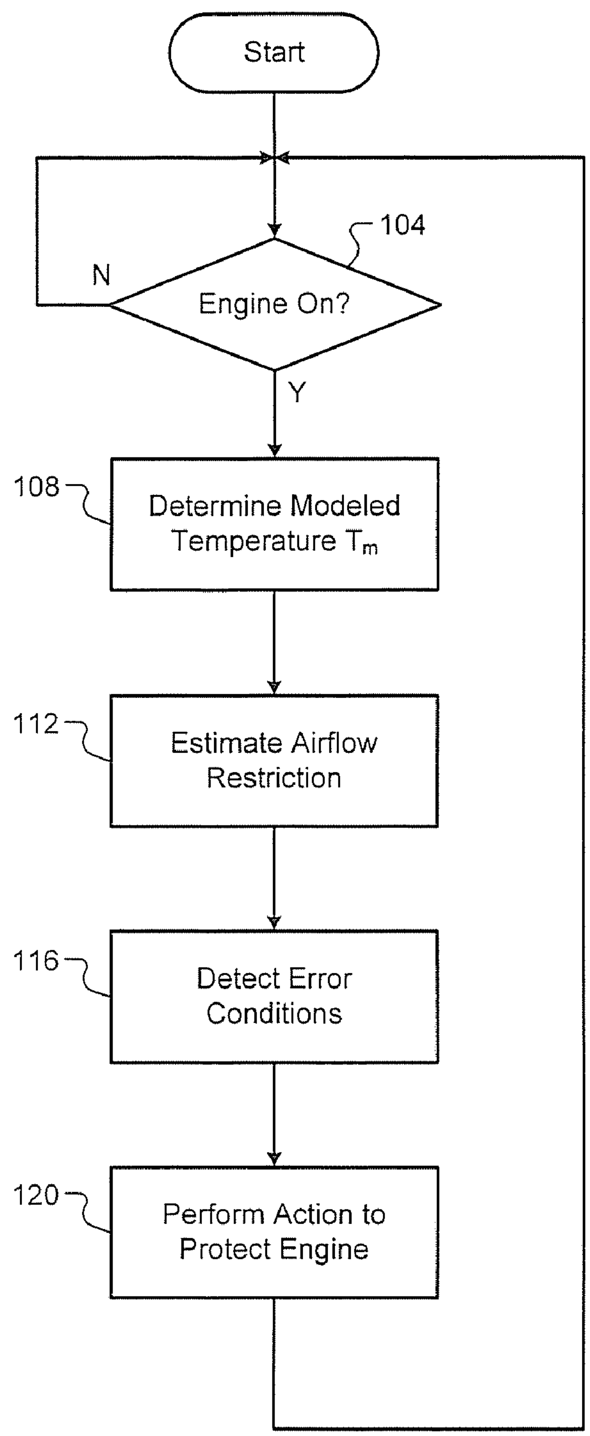
FIG. 3 is a flow diagram of a method for estimating airflow restriction of an engine air filter according to the present disclosure.

Referring now to FIG. 3, a method for estimating the airflow restriction of an engine air filter begins in step 104. In step 104, the control module 60 determines whether the engine 12 is on. If true, control may proceed to step 108. If false, control may return to step 104.

In step 108, the control module 60 determines the modeled outlet temperature $T_m$ based on the measured inlet temperature $T_1$ and the measured outlet pressure $P_2$. In step 112, the control module 60 estimates the airflow restriction by comparing the modeled and measured outlet temperatures $T_m$ and $T_2$, respectively.

In step 116, the control module 60 detects error conditions. In step 120, the control module 60 may perform an action to protect the engine 12 in response to the detected conditions (e.g., control boost, control fuel, and/or generate warnings). Control may then return to step 104.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system for an engine that includes a turbocharger, comprising:

a first electronic circuit configured to estimate restriction of airflow through an air filter of the engine based on a comparison between measured and modeled temperatures at an outlet of a compressor of the turbocharger; and a second electronic circuit configured to, based on the estimated airflow restriction, at least one of control turbocharger boost, control turbocharger airflow, control a fueling rate of the engine, and generate a warning signal for a driver of a vehicle and to command a predetermined offset to a barometric pressure sensor based on the estimated airflow restriction.

2. The control system of claim 1, wherein the modeled temperature is based on a measured temperature at an inlet of the compressor, a pressure at the inlet of the compressor, and a measured pressure at the outlet of the compressor.

3. The control system of claim 1 wherein the first and second electronic circuits include at least one of an Application Specific Integrated Circuit (ASIC), a processor and memory including code, and a combinational logic circuit.

4. The control system of claim 1, wherein the second electronic circuit is configured to decrease at least one of boost of the turbocharger and airflow of the turbocharger when the estimated airflow restriction is greater than a first predetermined threshold, wherein the boost and airflow of the turbocharger are further based on engine speed and vehicle altitude.

5. The control system of claim 4, wherein the second electronic circuit is configured to at least one of decrease a maximum fuel rate of the engine and limit the fuel rate of the engine to command a limp-home mode of the engine when the estimated airflow restriction is greater than a second predetermined threshold, wherein the maximum fuel rate of the engine is further based on engine speed and vehicle altitude, and wherein the second predetermined threshold is greater than the first predetermined threshold.

6. The control system of claim 1, further comprising:

a third electronic circuit configured to detect whether replacement of the air filter is required based on the estimated airflow restriction during a first predetermined period.

7. The control system of claim 6, wherein the third electronic circuit is configured to detect that replacement of the air filter is required when the estimated airflow restriction during the first predetermined period indicates an airflow restriction greater than a predetermined restriction threshold.

8. The control system of claim 7, further comprising:

a fourth electronic circuit configured to detect whether the air filter is restricted by at least one of snow and ice based on the estimated airflow restriction and a measured temperature at an inlet of the compressor during a second predetermined period, wherein the second predetermined period is less than the first predetermined period.

9. The control system of claim 8, wherein the fourth electronic circuit is configured to detect that the air filter is restricted by at least one of snow and ice when a rate of change of the estimated airflow restriction during a third predetermined period is greater than a predetermined rate of change threshold and when the measured temperature at the inlet of the compressor is less than a predetermined temperature threshold, wherein the third predetermined period is less than or equal to the second predetermined period.

10. The control system of claim 9, wherein the second electronic circuit is configured to generate a replacement signal for the driver of the vehicle when the third electronic circuit detects that replacement of the air filter is required and to generate a restriction signal for the driver of the vehicle when the fourth electronic circuit detects that the air filter is restricted by at least one of snow and ice.

11. A method for an engine that includes a turbocharger, comprising:

estimating restriction of airflow through an air filter of the engine based on a comparison between measured and modeled temperatures at an outlet of a compressor of the turbocharger;

based on the estimated airflow restriction, at least one of controlling turbocharger boost, controlling turbocharger airflow, controlling a fueling rate of the engine, and generating a warning signal for a driver of a vehicle; and commanding a predetermined offset to a barometric pressure sensor based on the estimated airflow restriction.

12. The method of claim 11, wherein the modeled temperature is based on a measured temperature at an inlet of the compressor, a pressure at the inlet of the compressor, and a measured pressure at the outlet of the compressor.

13. The method of claim 11, further comprising:

decreasing at least one of boost of the turbocharger and airflow of the turbocharger when the estimated airflow restriction is greater than a first predetermined threshold, wherein the boost and airflow of the turbocharger are further based on engine speed and vehicle altitude.

14. The method of claim 13, further comprising:

at least one of decreasing a maximum fuel rate of the engine and limiting the fuel rate of the engine to command a limp-home mode of the engine when the estimated airflow restriction is greater than a second predetermined threshold, wherein the maximum fuel rate of the engine is further based on engine speed and vehicle altitude, and wherein the second predetermined threshold is greater than the first predetermined threshold.

15. The method of claim 11, further comprising:

detecting whether replacement of the air filter is required based on the estimated airflow restriction during a first predetermined period.

16. The method of claim 15, further comprising:

detecting that replacement of the air filter is required when the estimated airflow restriction during the first predetermined period indicates an airflow restriction greater than a predetermined restriction threshold.

17. The method of claim 16, further comprising:

detecting whether the air filter is restricted by at least one of snow and ice based on the estimated airflow restriction and a measured temperature at an inlet of the compressor during a second predetermined period, wherein the second predetermined period is less than the first predetermined period.

18. The method of claim 17, further comprising:

detecting that the air filter is restricted by at least one of snow and ice when a rate of change of the estimated airflow restriction during a third predetermined period is greater than a predetermined rate of change threshold and when the measured temperature at the inlet of the compressor is less than a predetermined temperature threshold, wherein the third predetermined period is less than or equal to the second predetermined period.

19. The method of claim 18, further comprising:

generating a replacement signal for the driver of the vehicle in response to detection that replacement of the air filter is required; and generating a restriction signal for the driver of the vehicle in response to detection that the air filter is restricted by at least one of snow and ice.

* * * * *